United States Patent [19]

Kraus

[11] 4,001,839

[45] Jan. 4, 1977

[54] LIQUID JET RECORDER

[75] Inventor: Helmut Kraus, Erlangen, Germany

[73] Assignee: Siemens Aktiengesellschaft, Berlin & Munich, Germany

[22] Filed: Sept. 30, 1974

[21] Appl. No.: 511,031

[30] Foreign Application Priority Data

Oct. 2, 1973 Germany .......................... 2349459

[52] U.S. Cl. .............................. 346/75; 346/140 R

[51] Int. Cl.$^2$ ...................... G01D 15/18; B41J 3/04

[58] Field of Search ............... 346/140, 75; 417/12; 239/70, 106; 222/70, 148

[56] References Cited

UNITED STATES PATENTS

| | | | |
|---|---|---|---|
| 2,628,881 | 2/1953 | Adams | 222/70 X |
| 3,416,153 | 12/1968 | Hertz et al. | 346/75 |
| 3,661,304 | 5/1972 | Martinez et al. | 346/75 X |
| 3,673,601 | 6/1972 | Hertz | 346/75 |
| 3,925,788 | 12/1975 | Kashio | 346/75 |
| 3,925,789 | 12/1975 | Kashio | 346/75 |

*Primary Examiner*—Joseph W. Hartary
*Attorney, Agent, or Firm*—Hill, Gross, Simpson, Van Santen, Steadman, Chiara & Simpson

[57] ABSTRACT

A liquid jet recorder having at least one jet nozzle which is directed towards a recording carrier, and which is connected to a supply pump for the recording liquid. The liquid jet recorder incorporates a liquid-conveying pump which is activated at predetermined intervals for short periods of time between writing periods, so as to practically completely prevent the drying-in of the recording liquid within the jet nozzle.

6 Claims, 3 Drawing Figures

LIQUID JET RECORDER

FIELD OF THE INVENTION

The present invention relates to a fluid or liquid jet recorder.

DISCUSSION OF THE PRIOR ART

A liquid jet recorder having at least one jet nozzle which is directed towards a recording carrier, and which is connected to a supply pump for the recording liquid, is described in U.S. Pat. No. 3,416,153. By means of this liquid jet recorder it is, for example, possible to record an image in a linewise manner on a sheet of writing paper. The liquid jet which is ejected from the jet nozzle is herewith modulated in accordance with the image information. The image resolution depends upon the diameter of the jet nozzle. The smaller this diameter, the finer the ejected liquid jet and the more image lines can, as a result, be employed for the recording of an image.

A disadvantage encountered in the prior art liquid jet recorder is that, in the use of a jet nozzle having a small internal diameter, it is quite easy for stoppage to occur of the jet nozzle through dried-in ink residues. Ink residues may dry within the jet nozzle when the recorder is not utilized for a lengthy period of time.

SUMMARY OF THE INVENTION

Accordingly, it is an object of the present invention to provide a liquid jet recorder incorporating a liquid-conveying pump which is activated at predetermined intervals for short periods of time between writing periods, so as to practically completely prevent the drying-in of the recording liquid within the jet nozzle.

The foregoing is inventively achieved in that the pump has a timer switch arrangement associated therewith, which actuates the pump during writing pauses for short periods at predetermined intervals. Due to the periodic actuation of the liquid-conveying pump during the writing pauses, there is provided a regulator through rinsing of the jet nozzle in the inventive liquid jet recorder, so as to prevent the ink from drying in the jet nozzle.

BRIEF DESCRIPTION OF THE DRAWINGS

Further details of the invention may now be ascertained from the following description of an exemplary embodiment, taken in conjunction with the accompanying drawings; in which.

DETAILED DESCRIPTION

Figure 1:
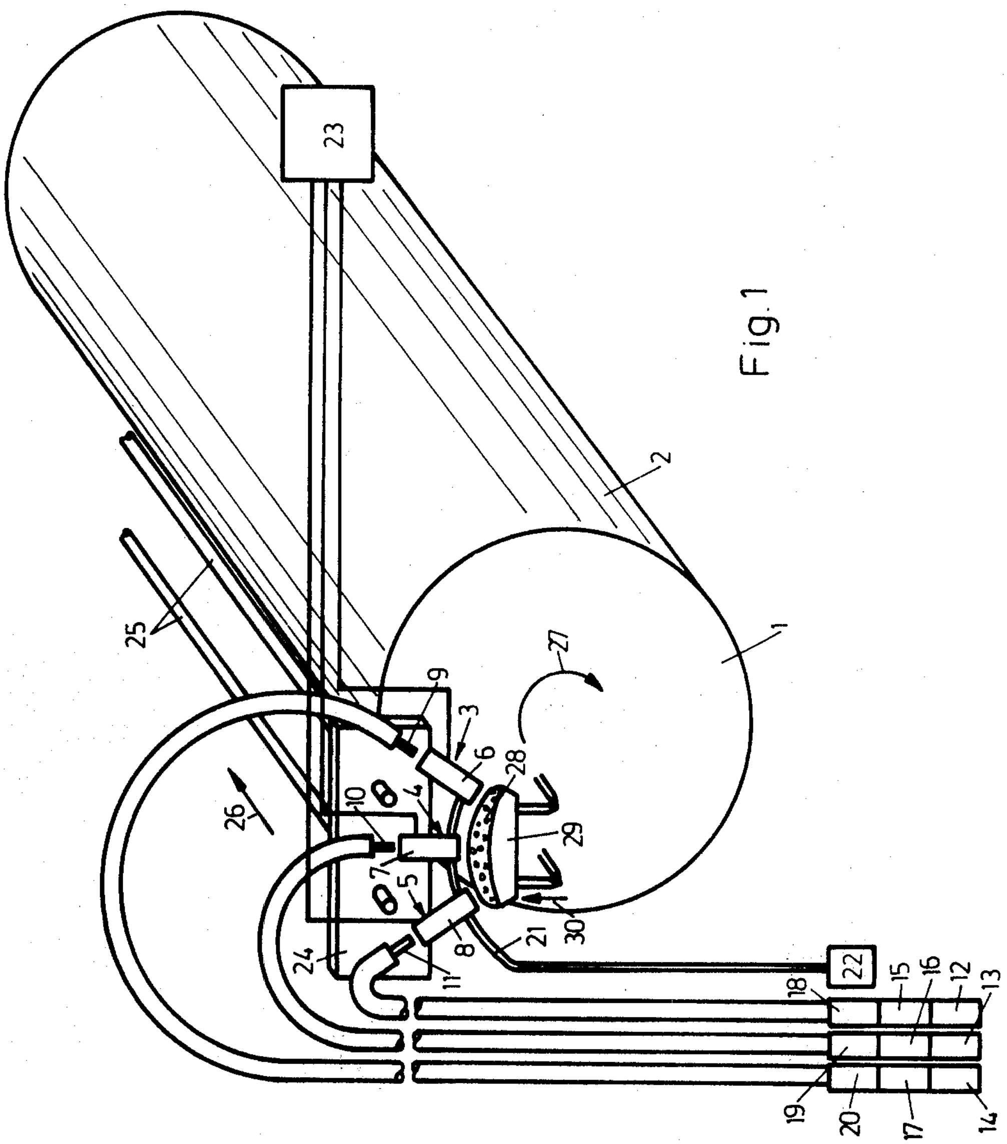
FIG. 1 shows a schematic representation of a liquid jet recorder constructed pursuant to the invention.

The fluid or liquid jet recorder, as shown in FIG. 1, includes a drum 1 on which there is stretched or mounted a recording carrier 2 constituted of a sheet of paper. For recording there are employed three recording or scribing systems 3 through 5 which, respectively, consist of a control electrode 6 through 8, and a jet nozzle 9 through 11. The jet nozzles 9 through 11 project the required recording liquid from supply receptacles 12 through 14 through the use of pumps 15 through 17, through the control electrodes 6 through 8. Between the jet nozzles 9 through 11 and pumps 15 through 17 there may also be, respectively, positioned pressure regulators 18 through 20.

The three recording systems serve for the recording or inscribing of three varied colors, for example, the colors blue, red and yellow, so that a colored image is inscribed on the recording carrier 2. The control electrodes 6 through 8 are passed through by the liquid jet ejected from jet nozzles 9 through 11. These liquid jets disintegrate into drops within the tubularly-shaped control electrodes so that, upon application of a high voltage between the control electrodes and the recording liquid, there is produced a vapor cloud. This vapor cloud precipitates on the control electrodes, the latter of which are formed of a porous material, and are then aspirated by a suction conduit 21 through the intermediary of a suction pump 22. The control impulses for the control electrodes 6 through 8 emanate from a control installation 23. If a control impulse is lacking, then a color point is generated on the recording carrier 2; however, if a control impulse is present, then the flow of liquid between the respective jet nozzles 9 through 11 and the recording carrier 2 is interrupted.

The recording systems 3 through 5 are fastened onto a plate 24 which is longitudinally displaceably supported on two rails 25. The recording systems 3 through 5 and the plate 24, in the position shown in FIG. 1, are illustrated in their inactive position away from the recording carrier 2. The recording is carried out in a manner wherein the plate 24 is uniformly moved along rails 25 in the direction of arrow 26 over the entire length of the drum, while the drum 1 is uniformly rotated in the direction of arrow 27, or reversely. The recording thus is effected in a helix-like path on the recording carrier 2. The signals of the control installation 23 contain the image information.

After the completion of a recording or inscription, the plate 24 together with the recording systems 3 through 5, is again moved back into the illustrated inactive or initial position.

In order that residuals or excesses of the recording liquid may be removed from the recording systems 3 through 5, there is provided a suction pad 28 which is supported in a pan 29, and which is commonly associated with the control electrodes 6 through 8. The pan 29 is movable in the direction of arrow 30 in such a manner, whereby the suction pad 28 may be pressed against the jet outlet sides of the electrodes 6 through 8.

Figure 2:
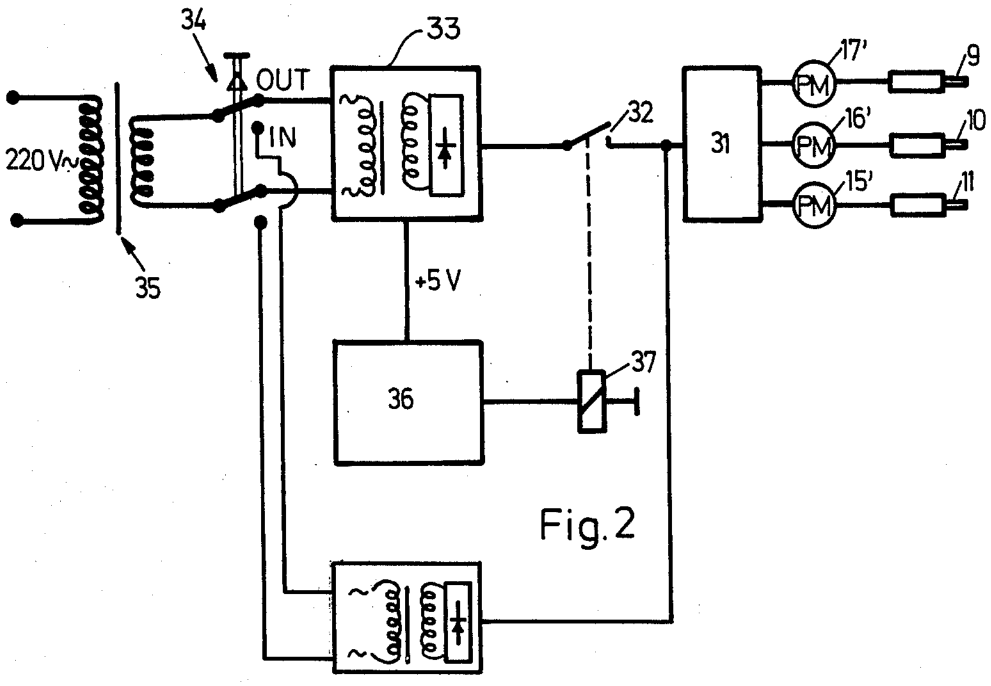
FIG. 2 shows a circuit diagram for the liquid jet recorder of the invention.

From FIG. 2 of the drawings there may be ascertained that pump motors 15' through 17' are connected to a control electronic 31, the latter of which contains the pressure regulators 18 through 20. The control electronic 31 is connectable to a voltage supply 33 by means of a contact 32, which delivers the required operating voltage. The voltage supply 33 is connected to a source of voltage through the intermediary of a power key 34 when the power key assumes its "out" position, meaning, when the liquid jet recorder is not in operation. The power supply to the voltage supply 33, in this instance, is effected from the power supply through a transformer 35.

Figure 3:
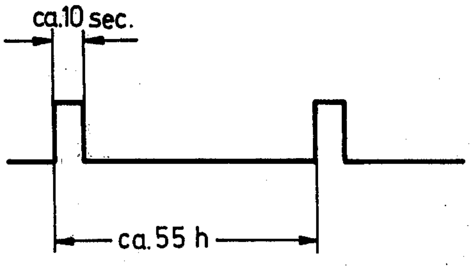
FIG. 3 is a graph of the voltage sequence of the circuit diagram of FIG. 2.

The voltage supply 33, in addition to the operating voltage for the control electronic 31, delivers also the operating voltage for a timer switch electronic 36 which supplies a relay 37 with its output signal, and which actuates the contact 32. The output voltage of the timer switch electronic 36, in the switched-off position of the power key 34, extends pursuant to the graph in FIG. 3, meaning that after an approximately 10 second long impulse, which excites the relay 37, there follows a pause of approximately 55 hours.

When the liquid jet recorder is not utilized, and therefor the power key 34 assumes its illustrated position, the pump motors 15' through 17' are periodically actuated through the relay 37 across contact 32, each 55 hours for a duration of approximately 10 seconds so as to eject recording liquid through the jet nozzles 9 through 11. This recording liquid is then absorbed up by the suction pad 28, since the jet nozzles 9 through 11 are positioned above the suction pad 28 when the liquid jet recorder is not operated. Through the periodic through-rinsing of the jet nozzles 9 through 11, drying-in of ink residue is prevented with complete assurance.

The above-mentioned time periods of, respectively, 55 hours and 10 seconds only represent examples. Thus, within the scope of the invention, these time periods may be varied in accordance with any particular requirements. However, it has been proven to be particularly satisfactory that the time interval which lies between two actuating sequences for the pump motors lie within a magnitude of 1 day to 1 week, and that the actuated duration of the pump motors be of a magnitude measured in seconds. In this manner, there is prevented a too rapid dirtying of the suction pad 28 by the recording liquid.

Within the scope of the invention it is not essential as to how many nozzles are contained by the liquid jet recorder. The invention, in addition to a three-jet liquid beam recorder is also applicable to a liquid jet recorder having a single liquid jet, for example, for recording of a black-white image. However, it naturally is a requirement of the invention that the recorder be connected to the power or voltage circuit.

In the example of FIG. 2, the pump motors 15' through 17' are, naturally, during recording of an image supplied with voltage through the closed contacts of the power switch 34.

While there has been shown what is considered to be the preferred embodiment of the invention, it will be obvious that modifications may be made which come within the scope of the disclosure of the specification.

What is claimed is:

1. In a liquid jet recorder having at least one jet nozzle directed towards a recording carrier; and a pump connected to said jet nozzle for supplying recording liquid thereto; an electrical power supply for energizing said pump during recording periods of said recorder, the improvement comprising: a timer switch arrangement connected to said pump; and a switch having first and second positions, said switch connecting said power supply to said pump in said first position, said switch connecting said power supply to said timer switch arrangement in said second position, said timer arrangement being adapted to actuate said pump for short periods of time when said recorder is in a non-recording state whereby recording liquid is pumped to said nozzle during non-recording intervals to avoid nozzle clogging.

2. A recorder as claimed in claim 1, said predetermined intervals being of the magnitude ranging from about 1 day to 1 week.

3. A recorder as claimed in claim 1, said pump being actuated for short periods in the magnitude of a few seconds.

4. A recorder as claimed in claim 1, comprising a recording liquid suction pad, said jet nozzle being directed towards said suction pad in the inoperative condition of said recorder.

5. A recorder as claimed in claim 4, said suction pad being exchangeably mounted on said recorder.

6. A recorder as claimed in claim 1, comprising power supply circuit means for the activation and deactivation of the recording elements of said recorder; and voltage supply means for said timer switch arrangement being connectable to said power supply in the switched-off condition of said power supply circuit means.

* * * * *